Figure 1:
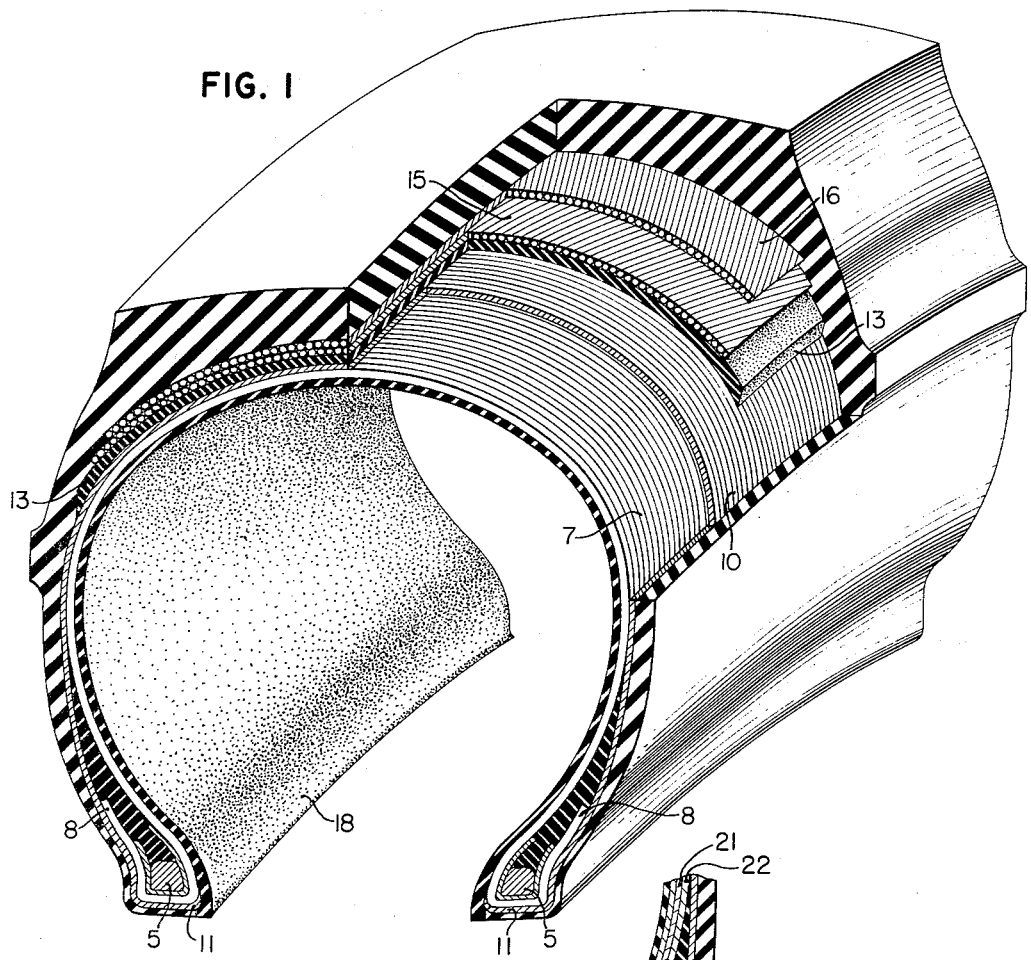

April 12, 1966  K. R. LEWIS  3,245,454
TIRE
Filed April 23, 1964

INVENTOR.
KENNETH R. LEWIS
BY
*J.B. Holden*
ATTORNEY

United States Patent Office 3,245,454
Patented Apr. 12, 1966

3,245,454
TIRE
Kenneth R. Lewis, Akron, Ohio, assignor to The Goodyear Tire & Rubber Company, Akron, Ohio, a corporation of Ohio
Filed Apr. 23, 1964, Ser. No. 361,974
3 Claims. (Cl. 152—354)

This invention relates to an improved radial-ply tire of belted construction. It may be a smaller tire such as used on passenger cars, etc., or a larger tire such as used on busses, trucks, etc. It may have single beads or double beads. It may or may not contain an air-impervious liner on its inner surface.

The inner ply or plies of this tire are fundamentally radial (i.e. they make an angle of 80 to 90 degrees with the beads). They comprise wire, rayon, polyester, nylon, glass or other relatively non-heat-shrinkable reinforcing material covered with rubber in the usual way. The turned-up endings of the cords in these fundamentally radial plies are tied in to the bead-to-bead portions of the plies by a tied-in area which is narrower than usual to prevent flex failures. This tied-in area will extend up on the outside of the tire at least as far as the top of the bead, but it will not extend up further than one-fourth of the vertical distance from the base of the bead to the tread surface of the tire. As a consequence, the bond at each tie-in is not strong. Over the tie-in are one or more plies reinforced with nylon or other heat-shrinkable elastic, fatigue-resistant reinforcement, which are also fundamentally radial and they are turned down around the bead with their edges coming to the toe of the bead. Although generally these tie-in plies will extend from bead to bead, this is not essential. They will necessarily extend up on the outside of the tire far enough to be anchored under the plies of the belted construction.

By referring to the tire as being of belted construction, it is meant that there is circumferential reinforcement of one or more plies of wire, rayon, fiberglass, polyester or the like between the radial plies and the tread surface, with a cushion of gum stock which does not extend to the beads placed between the outer nylon or other tie-in ply and the plies of the belted construction. This circumferential reinforcement is covered with the tire tread.

The one or more nylon-reinforced or other tie-in plies form a strong bond with the turned-up endings of the inner ply or plies and this prevents slippage of their endings prior to or during the curing of the tire and supports the tie-in. Nylon is recommended because it will stand up under the compressive action of the tire as it is flexed over the rim flange when under load. Rayon, for example, would not be satisfactory. Furthermore, the characteristic shrinkage of the nylon during cure, maintains a tension on the turned-up endings of the underply or underplies during the curing and prevents slippage. This heat-shrinkage characteristic of nylon reduces or eliminates the tendency of the outer plies to wrinkle as the tire is changed from cored shape to molded shape.

The invention is further described in connection with the accompanying drawings, in which—

Figure 2:
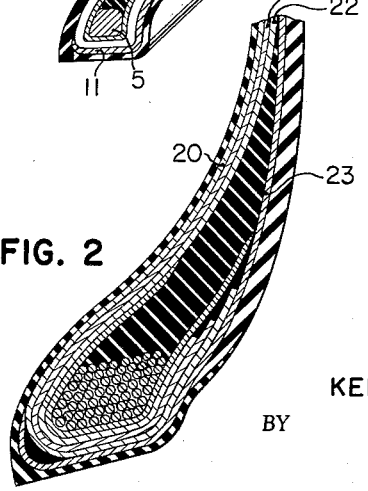

FIGURE 1 is a view in perspective of a section of a tire with a part thereof cut away to more clearly illustrate the invention; and FIGURE 2 is a fragmentary sectional view of an alternative structure.

The tire is of the usual generally toroidal shape, with two beads 5. In the inner ply 7, the reinforcing, relatively non-heat-shrinkable filaments of wire, cord or polyester are fundamentally perpendicular to the beads. The edges 8 are turned up around the bead and tied into the underlying filaments in the usual manner, with the outer edge of the inner ply at a location between the top of the bead and one-quarter the vertical height of the unloaded tire between the base of the bead and the tread surface.

Over this inner ply 7 is the ply 10 reinforced with nylon or other heat-shrinkable elastic, fatigue-resistant reinforcement which extends from bead to bead and is heat-shrinkable compared to the relatively non-heat-shrinkable reinforcement of the inner ply 7. Its edges 11 are turned in and anchored under the beads in the usual manner. This nylon-reinforced ply is covered with a cushion ply 13 of gum stock the edges of which do not extend to the beads. Two wire breaker plies 15 and 16 are positioned over the cushion ply. The wire reinforcement of the breakers are on a bias, making an angle with the centerline of the tread which may vary from 10° to usually not more than about 40°, an angle of about 16° being usual. FIGURE 1 shows an air-impervious liner 18, but this is optional.

Sidewalls and tread of usual construction are added. The various plies are covered with rubber and when the tire is vulcanized the rubber which covers the edges of the respective plies is vulcanized to the rubber on the underlying ply portions.

In FIGURE 2 a similar structure is shown, but in a tire with three inner plies 20, 21 and 22 reinforced with nylon or other heat-shrinkable elastic, fatigue-resistant reinforcement ply 23. This ply 23 is turned down around the beads.

The overlapping of the ply 23 over the endings of the inner plies 20, 21 and 22, locks the turn-up of the inner plies to prevent slippage in the uncured tire particularly during shaping. During cure, the shrinkage of the nylon maintains a tension in the inner ply or plies which reduces or prevents wrinkles forming.

The invention is described in the claims which follow.
What I claim is:

1. A radial pneumatic tire of belted construction having laterally spaced beads and a generally toroidal carcass portion which includes at least one inner ply with a reinforcement of relatively non-heat-shrinkable composition which is essentially radial and turned up around the beads and tied in to the bead-to-bead portion thereof with its edge at a location between the top of the bead and one-quarter the vertical height of the unloaded tire between the base of the bead and the tread surface, and over this at least one essentially radial tie-in ply reinforced by heat-shrinkable elastic, fatigue-resistant reinforcement which is anchored under the belted construction with its bottom edges turned down around the beads, said tie-in ply being shrunken after curing as compared with its precured condition whereby it maintains a tension on the inner ply or plies reinforced with relatively non-heat-shrinkable reinforcement and inhibits the formation of wrinkles in the said tie-in ply.

2. The tire of claim 1 in which the one or more tie-in plies extend from bead to bead.

3. The tire of claim 1 in which the one or more tie-in plies are of nylon.

References Cited by the Examiner
UNITED STATES PATENTS

| | | | |
|---|---|---|---|
| 1,347,847 | 7/1920 | Grabau et al. | 142—354 |
| 2,063,105 | 12/1936 | King | 152—356 |
| 2,895,525 | 7/1959 | Lugli | 152—354 |
| 2,985,214 | 5/1961 | Lugli | 152—355 X |
| 2,990,870 | 7/1961 | Vittorelli | 152—356 |

ARTHUR L. LA POINT, Primary Examiner.

C. W. HAEFELE, Assistant Examiner.